United States Patent [19]
Gorbatov et al.

[11] 4,103,354
[45] Jul. 25, 1978

[54] PROCESS AND APPARATUS FOR VACUUM TREATMENT OF VISCOPLASTIC MATERIALS

[76] Inventors: Vasily Matveevich Gorbatov, prospekt Mira, 74, kv. 70, Moscow; Taras Filippovich Demchenko, Pselskaya ulitsa, 8, kv. 37, Sumy; Semen Mikhailovich Bobylev, ulitsa Salvadora Aliende, 5, kv. 63; Valery Semenovich Bobylev, Proletarsky prospekt, 1, kv. 36, both of Moscow; Leonid Filippovich Zhilkin, ulitsa Kirova, 122, kv. 65, Sumy; Evgeny Timofeevich Spirin, ulitsa Usacheva, 29, korpus 3, kv. 203; Genrikh Grigorievich Shirinian, Kantimirovskaya ulitsa, 3, korpus 2, kv. 251, both of Moscow, all of U.S.S.R.

[21] Appl. No.: 751,950

[22] Filed: Dec. 17, 1976

[30] Foreign Application Priority Data

Dec. 19, 1975 [SU] U.S.S.R. .................................. 2301129

[51] Int. Cl.² .............................................. B29B 1/06
[52] U.S. Cl. ..................................... 366/88; 366/321; 366/266; 366/322; 366/139; 366/131
[58] Field of Search ...................... 366/80, 81, 85, 86, 366/139, 131, 266, 321, 322, 79; 425/208, 209

[56] References Cited

U.S. PATENT DOCUMENTS

| 918,749 | 4/1909 | Hommel | 366/139 |
|---|---|---|---|
| 3,224,739 | 12/1965 | Shuur | 366/321 |
| 3,985,348 | 10/1976 | Skidmore | 366/81 |

*Primary Examiner*—Robert W. Jenkins
*Attorney, Agent, or Firm*—Steinberg & Blake

[57] ABSTRACT

In accordance with the process, a continuously fed viscoplastic material is subjected to a vacuum treatment in a thin layer with subsequent formation of a higher pressure zone from the material. Then the material is again subjected to the vacuum treatment in a thin layer, and a second higher pressure zone is formed from the material prior to feeding it to a next production stage. In an apparatus for carrying out the process for vacuum treatment, there is provided a container accommodating an auger having main and auxiliary turns running in opposite directions for feeding the material in a thin layer and for forming higher pressure zones from the material. There are provided a pipe in the container which is connected to a vacuum system for forming a vacuum zone in the container and means returning the material from one of the higher pressure zones back to the vacuum zone. The production process of vacuum treatment is thereby considerably accelerated and the material of better quality is obtained.

4 Claims, 3 Drawing Figures

PROCESS AND APPARATUS FOR VACUUM TREATMENT OF VISCOPLASTIC MATERIALS

The present invention relates to processes and equipment for vacuum treatment of viscoplastic materials and may be successfully used in the food industry for vacuum treatment of cut food products, such as sausage meat in making sausages, as well as in the chemical, pharmaceutical and other industries.

It is known from the food production practice that vacuum treatment (deaeration) substantially affects quality of manufactured products because the presence of air inclusions in such products determines colour, structure, stability during storage and physical and chemical processes thus influencing, in the end, commercial quality of products.

Therefore, vacuum treatment of cut food products is the most important process in the manufacture, especially as far as sausages production is concerned.

There are a number of processes and apparatus which enable vacuum treatment of e.g. cut food products. Thus, single- and double-screw continuous injectors, a vacuum extruder "IDEAL" made in Czechoslovakia, excentric-blade injectors, single- and double-cylinder extruders are known to be used for the purpose.

The process for vacuum treatment carried out by using a single- or double-screw extruder in the following manner: continuously fed material (cut product) is subjected to vacuum treatment in a thin layer in a vacuum zone with concurrent continuous feeding of the material to a next production stage with preliminary formation of a higher pressure zone from the product.

The above-described process, as well as all known constructions of vacuum treatment apparatus perform vacuum treatment to a certain extent. The efficiency of their operation is not, however, very high, while the construction of the apparatus is rather complicated.

In the continuous extruders-injectors (of the screw and excentric-blade type) the vacuum treatment is made is single-action treatment with a thick layer of product. In addition, the vacuum zone is maintained by means of a system of packings which are prone to rapid wear during operation so that machine oil may enter the vacuum zone of the apparatus under the action of atmospheric pressure and get penetrated to the product.

Cylindrical-type constructions are of the intermittent action and require complicated auxiliary devices to be used for loading and transfer of the product which is treated in the vacuum zone in a thick layer.

Thus, the efficiency of operation of such apparatus is rather low.

It is an object of the invention to provide process and apparatus for vacuum treatment of viscoplastic materials which provide for high degree of vacuum treatment of the material and contribute to improvement of its physical and chemical properties with continuous feeding of the viscoplastic material, simple construction of the apparatus and increased throughput capacity thereof.

With these and other objects in view, in the process for vacuum treatment of a viscoplastic material comprising causing continuously fed material to move in a thin layer and subjecting it to a vacuum treatment in a vaccum zone with concurrent continuous feeding to a next production stage after having preliminarily formed a higher pressure zone from the material, according to the invention, the material continuously leaving the higher pressure zone is subjected to a secondary vacuum treatment in a thin layer with continuous movement thereof prior to feeding to the next production zone, with subsequent formation of a second higher pressure zone from the material.

Double vacuum treatment which is used, e.g. for treating cut food products provides for substantial evacuation of air from the product thus enabling the manufacture of finished products having a compact structure. Products obtained from the material subjected to such vacuum treatment have better vendible appearance and are less prone to deformation. In addition, such treatment contributes to reduction of losses during subsequent heat treatment of the material due to its better moisture retaining capacity.

The provision of the second higher pressure zone eliminates penetration of atmospheric air to the material during its transfer to following production stages.

In accordance with an embodiment of the invention, the material is fed for secondary vacuum treatment to the vacuum zone in which the first vacuum treatment has taken place so as to considerably reduce the time required for the vacuum treatment process, simplify the apparatus for carrying out the process and obtain material of better quality.

The process according to the invention is carried out in an apparatus comprising a container having a pipe communicating with a vacuum system for providing a vacuum zone in the container, a hopper for continuous feeding of viscoplastic material to the container, an outlet opening for feeding the material from the container to the next production stage and an auger continuously causing the material to move in a thin layer to the outlet opening and forming a higher pressure zone from the material. According to the invention, the auger of the apparatus has auxiliary turns running opposite to the main turns and conjugated therewith along the line extending at the same level with the pipe communicating with the vacuum system, and the container is provided with means returning the material from the higher pressure zone back to the vacuum zone at the auxiliary turns of the auger which cause the material to move towards the outlet opening and form the second higher pressure zone of the material.

This construction features a small size and enables feeding of material for further treatment with concurrent double vacuum treatment. This is effected by using a single working member which is simple in the manufacture, while enabling an improvement of throughput capacity of the apparatus with low power requirements.

Simplicity of construction ensures high reliability in operation and easy sanitary treatment.

The construction of the working auger with oppositely running turns according to the invention provides for the formation of a higher pressure zone from the material being treated at both ends thereof thus eliminating the possibility of penetration of lubricants to the material.

The invention is further characterized in that means returning the material back comprises a passage communicating with the inner space of the container at the portion of corresponding to the formation of the first higher pressure zone and with the vacuum zone at the portion corresponding to the location of the auxiliary turns. Thus the material, such as cut food product may be transferred for further treatment without using any additional devices so as to eliminate its overworking, reduce redistribution of fat fractions and prevent discontinuity of flow under continuous operating conditions.

In accordance with one embodiment of the invention, the passage is provided in the auger and communicates with the container through at least two openings made in the auger, one opening being made at the end of the auger on the side of location of the main turns and having the cross-sectional area which is substantially smaller than that of the hopper opening, and the other opening being located adjacent to the line of conjugation of the turns on the side of the auxiliary turns.

In accordance with another embodiment of the apparatus, the passage is arranged outside the container and communicates therewith by means of at least two openings of the container, one opening being located adjacent to the auger end on the side of the main turns and having the cross-sectional area which is substantially smaller than that of the hopper opening, and the other being located adjacent to the line of conjugation of the auger turns on the side of the auxiliary turns thereof.

Therefore, the process of double vacuum treatment according to the invention provides for continuous deaeration of the material over a wide range of viscosity values.

Simplicity of structure allows the apparatus to be incorporated directly in the equipment of operating plants and ensures long service life of the apparatus.

Low metal consumption for the apparatus construction and high throughput capacity with required degree of vacuum treatment are the advantages of the apparatus according to the invention over similar devices of the type.

Novel design of the main working member — auger with oppositely running turns — provides for double-action delivery and eliminates penetration of machine oil to the material being treated.

The invention will now be described in details with reference to specific embodiments of the process and apparatus according to the invention for vacuum treatment of viscoplastic materials as applied to the vacuum treatment of cut food product with illustrations in the accompanying drawings, in which:

FIG. 1 diagrammatically shows a longitudinal section of the apparatus for vacuum treatment of cut food product according to the invention;

The process for vacuum treatment of cut food product according to the invention comprises causing a continuously fed product A to move in a thin layer B and subjecting it to a vacuum treatment in a vacuum zone C. Then a higher pressure zone D of the product A is formed during continuous movement of the product.

Subsequently, the product A continuously leaving the higher pressure zone D is subjected to a secondary vacuum treatment in a thin layer E with subsequent formation of a second higher pressure zone L from this product. During the formation of the second higher pressure zone L the product is fed to a next production zone.

It should be noted that the product is returned back to the vacuum zone C for the secondary vacuum treatment where the first vacuum treatment has taken place.

Figure 2:
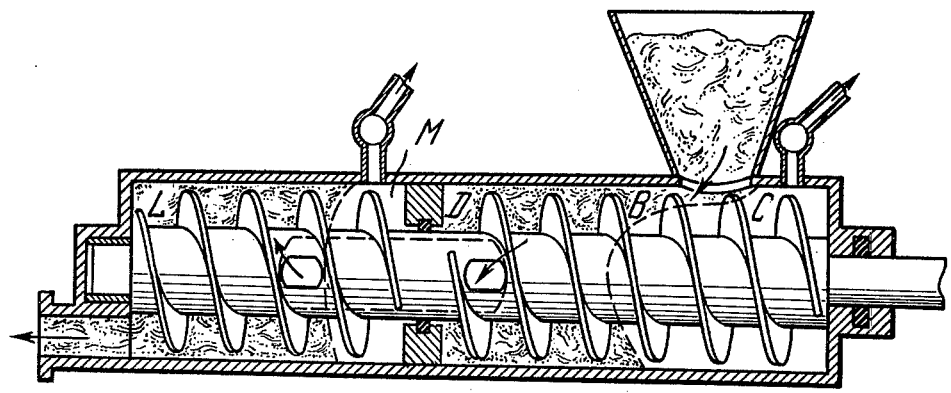
FIG. 2 is a diagrammatic view illustrating the process for vacuum treatment according to the invention.

A second vacuum zone M (FIG. 2) may be, however, provided which is located downstream the first vacuum zone C and is separated therefrom by the first higher pressure zone D of the product.

Figure 1:
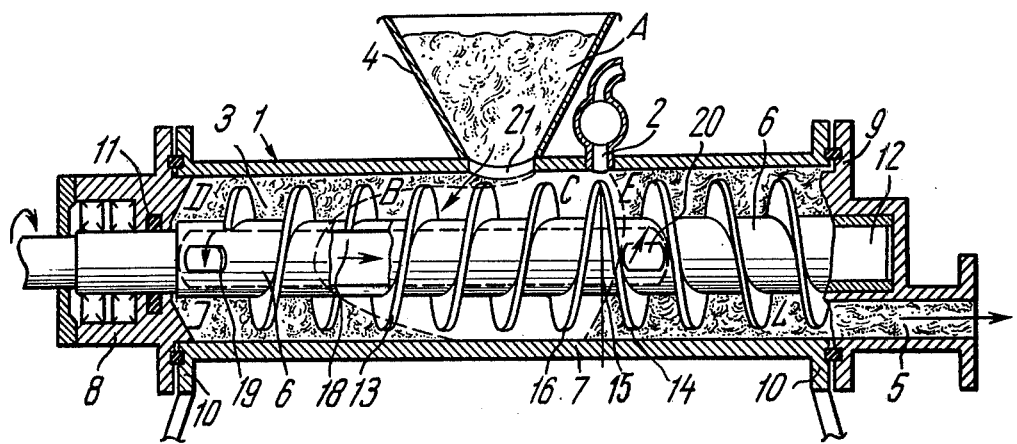
Figure 3:
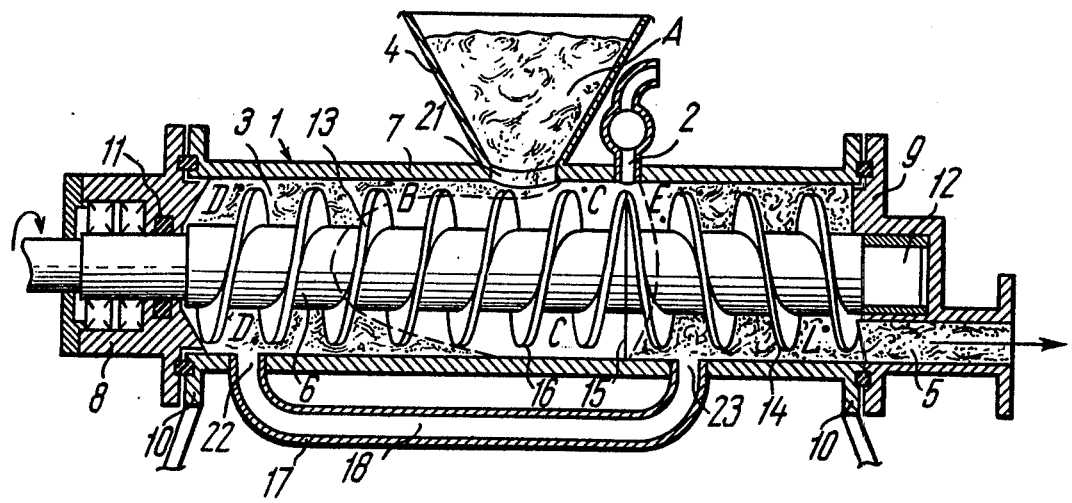
FIG. 3 shows a longitudinal section of another embodiment of the apparatus according to the invention.

The process for vacuum treatment of cut food product according to the invention is carried out in the apparatus shown in FIGS. 1 and 3.

Each apparatus comprises a container 1 having a pipe 2 communicating with a vacuum system (not shown in FIG. 1) for the formation of the vacuum zone C in the inner space 3 of the container 1, a hopper 4 for continuous feeding of the cut product A to the container 1, an outlet opening 5 for feeding the product A from the container 1 to the next production stage and an auger 6 causing the product to continuously move towards the outlet opening 5 in a thin layer with concurrent formation of the higher pressure zone L from the product. The direction of flow of the product A is shown by arrows in FIG. 1.

The container 1 is formed by a cylindrical casing 7 having end walls 8 and 9 secured to flanges 10 of the casing.

The end wall 8 has an opening for passage of the auger 6 and for accommodation of seals 11 preventing the product from passing towards the auger drive (not shown).

The end wall 9 has the outlet opening 5 for feeding the product from the container and a recess receiving an end 12 of the auger 6.

The auger 6 has main left-hand turns 13 and auxiliary right-hand turns 14. The turns 13 and 14 are conjugated along the line 15 extending at the same level with the pipe 2 communicating with the vacuum system.

With this embodiment, the flow rate of the product A fed by the auger 6 is selected higher than the rate of feeding of the product A from the hopper 4 so that the product can move in the thin layer B and E.

The vacuum zone C shown with dotted line in FIG. 1 is provided within the inner space of the container under the pipe 2 and at the portion of conjugation of the turns 13 and 14 during operation of the apparatus, while higher pressure zone D and L are formed adjacent to the end walls 8 and 9 of the product caused to move by the turns 13 and 14 of the auger. It should be noted that the vacuum zone C and the higher pressure zones D and L may be provided by using various structural measures well known to those skilled in the art, such as by increasing the rotational speed of the auger 6 or by diminishing spaces 16 between the extreme points of the turns 13 and 14 of the auger and the inner surface of the casing 7, as well as by reducing the cross-sectional area of the outlet opening for feeding the product form the apparatus.

The container 1 is provided with means 17 (FIG. 3) for returning the product from the higher pressure zone D back to the vacuum zone C to the auxiliary turns 14 of the auger 6 which cause the product to move towards the outlet opening 5 for leaving the apparatus with the formation of the second higher pressure zone L from the product. This means comprises a passage 18 communicating with the inner space of the container at the portion corresponding to the formation of the higher pressure zone D and with the vacuum zone C at the portion corresponding to the location of the auxiliary turns 14.

In accordance with the embodiment of the invention shown in FIG. 1, the passage 18 is made in the auger 6 and communicates with the container by means of two or more openings 19 and 20 made in the auger 6. The opening 19 is made at the end of the auger 6 on the side of location of the main turns 13 and has the cross-sectional area which is substantially smaller than that of an opening 21 of the hopper 4.

The opening 20 is made in the auger 6 on the side of location of the auxiliary turns 14 adjacent to the line 15 of conjugation of the turns 13 and 14.

In accordance with another embodiment of the invention shown in FIG. 3, the passage 18 is arranged outside the container 1 to extend in parallel with the casing 7 and communicates with the contained by means of two or more openings 22 and 23 provided in the casing 7 of the container 1.

The opening 22 is located adjacent to the end of the auger 6 on the side of the main turns 13 and has the cross-sectional area which is substantially smaller than that of the opening 21 of the hopper 4. The opening 23 is located adjacent to the line 15 of conjugation of the turns 13 and 14 of the auger 6 on the side of the auxiliary turns 14 of the auger.

The apparatus for vacuum treatment functions in the following manner.

During operation, the product A is continuously fed to the container, and air is continuously evacuated through the pipe 2 to form the vacuum zone C in the container.

During rotation of the auger 6, cut product from the hopper 4 is fed through the opening 21 to the inner space 3 of the container 1. The product is fed due to the fact that the main turns 13 of the auger 6 shear-off the thin layer B of the product and cause it to move towards the end wall 8. Thus the product passes through the vacuum zone C, and is subjected to the primary vacuum treatment. At the same time, during continuous feeding of the product by the turns 13 of the auger 6, the product is caused to move towards the end wall 8 and is compacted in the vicinity thereof due to the fact that the cross-sectional area of the opening 19 is smaller than that of the opening 21 of the hopper 4.

This facility provides for the formation of the first higher pressure zone D from the product thus causing the product to flow through the opening 19 along the passage 18 towards the opening 20. The product again gets into the vacuum zone C where its repeated vacuum treatment takes place, the product being fed from the opening 20 of the auxiliary turns 14 which cause it to move towards the end wall 9 to form the second higher pressure zone L from the product. The product is then fed through the outlet opening 5 to the next production stage under the action of pressure.

What is claimed is:

1. An apparatus for vacuum treatment of viscoplastic materials comprising: a container; a pipe connected to said container and communicating with a vacuum system for providing a vacuum zone in the container; a feed hopper connected to said container for continously feeding viscoplastic material to the vacuum zone of the container for first vacuum treatment of the material; an outlet opening for feeding the viscoplastic material from the container to a subsequent production stage; an auger located within said container and having main turns which continuously cause the viscoplastic material to move from the vacuum zone of the container and form a first higher pressure zone from the material; said auger having auxiliary turns running opposite to the direction of the main turns of the auger and conjugated with the main turns along a line extending at the same elevation as said pipe communicating with the vacuum system; said container having means for returning the viscoplastic material from the first higher pressure zone back to the vacuum zone for a secondary vacuum treatment thereof and feeding the material to said auxiliary turns of the auger which cause the material to move in the vacuum zone in a thin layer and form a second higher pressure zone from the material prior to its leaving through said outlet opening to the subsequent production stage.

2. An apparatus according to claim 1, wherein said means returning the material back comprises a passage communicating with the inner space of the container at the portion corresponding to the formation of the first higher pressure zone and with the vacuum zone at the portion corresponding to the location of the auxiliary turns.

3. An apparatus according to claim 2, characterized in that the passage is made in the auger and communicates with the container by means of at least two openings made in the auger, one opening being made at the end of the auger on the side of the location of the main turns and having a cross-sectional area which is substantially smaller than that of the hopper opening, and the other opening being located adjacent to the line of conjugation of the turns on the side of the auxiliary turns.

4. An apparatus according to claim 2, characterized in that the passage is arranged outside the container and communicates therewith by means of at least two openings made in the container, one opening being located adjacent to the end of the auger on the side of the main turns and having a cross-sectional area substantially smaller than that of the hopper opening, and the other opening being located adjacent to the line of conjugation of the auger turns on the side of the auxiliary turns of the auger.

* * * * *